March 4, 1969  P. X. MASCIANTONIO ET AL  3,431,266
METHOD FOR RECOVERY OF PYRIDINE BASES
Filed Oct. 6, 1965
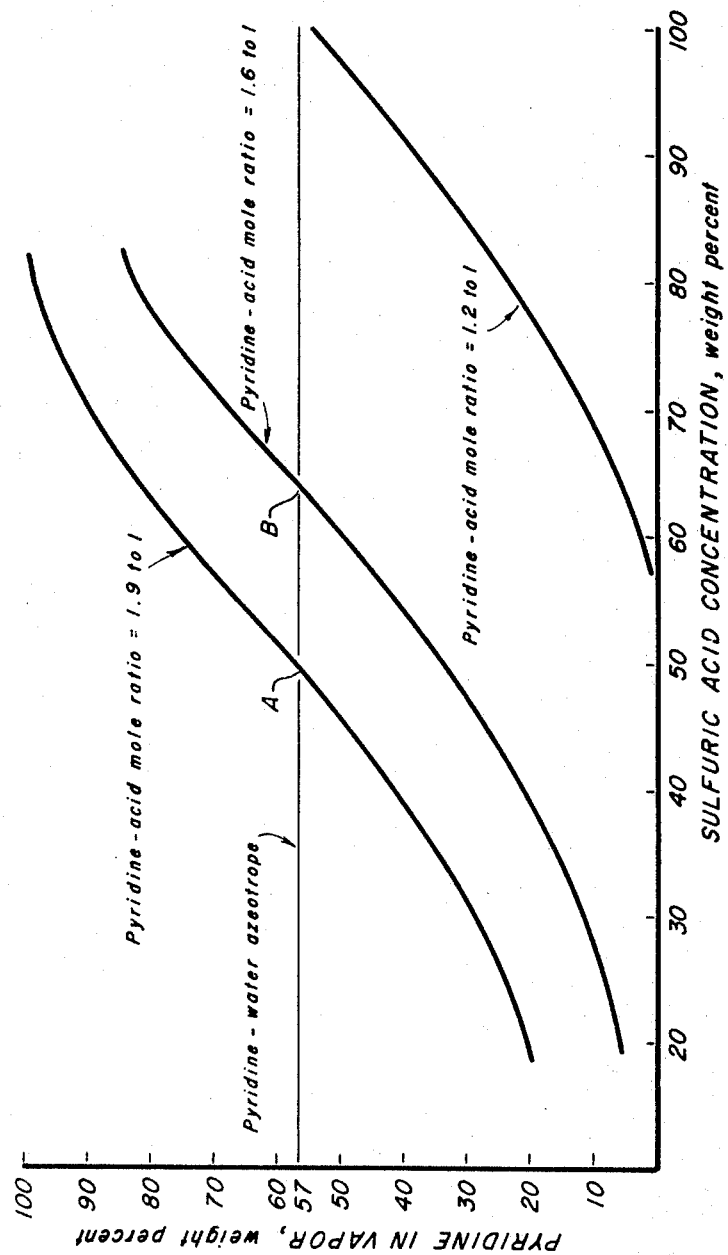
INVENTORS
PHILIP X. MASCIANTONIO and
JAMES H. SCHELLING
By Donald G. Dalton
Attorney

United States Patent Office 3,431,266
Patented Mar. 4, 1969

3,431,266
METHOD FOR RECOVERY OF PYRIDINE BASES
Philip X. Masciantonio, Penn Township, Westmoreland County, and James H. Schelling, Franklin Township, Westmoreland County, Pa., assignors to United States Steel Corporation, a corporation of Delaware
Filed Oct. 6, 1965, Ser. No. 493,507
U.S. Cl. 260—290                                      6 Claims
Int. Cl. C07d 31/16

ABSTRACT OF THE DISCLOSURE

A hydrocarbon oil containing pyridine bases, referred to as pyridine is contacted with an aqueous solution of sulfuric acid having a concentration greater than about 50% by weight acid. The oil is separated from the resulting solution of pyridine sulfate and acid and the solution is heated to distill a pyridine-water composition exceeding the azeotrope. The latter is fractionated to distill pyridine-water azeotrope from anhydrous pyridine product. The residue and pyridine-water azeotrope are combined to treat more hydrocarbon oil.

---

This invention relates to a process of recovering pyridine bases from hydrocarbon oils containing them.

It is known to recover pyridine bases from, for instance, coke-oven light oil by admixing the oil with dilute sulfuric acid. The resulting acid or sulfate solution of pyridine bases is separated from the oil and then treated with a strong base, for example, ammonia gas. The pyridine bases are liberated and may be separated by gravity from the aqueous ammonium sulfate solution. The sprung bases are fractionally distilled. The forerunnings portion is admixed, for example, with benzene to extract and separate the bases from the water. According to another known method, the said sulfate solution may be directly distilled and the pyridine base vapors extracted with benzene during condensation.

The above methods are characterized by high reagent or distillation costs and considerable loss of bases. These methods cannot directly produce pyridine bases richer than about 57%, the concentration of the pyridine base-water azeotrope. This azeotrope cannot be avoided in these methods unless a water-immiscible solvent, such as benzene, is introduced into the distillation to eliminate the azeotrope problem.

An object of the present invention is to provide an improved process of recovering pyridine bases from hydrocarbon oil, whereby losses in bases and high distillation and reagent costs are reduced. A further object is to provide a recovery process utilizing sulfuric acid having a concentration in excess of about 50% by weight acid in which regenerated acid is readily recovered for reuse. Yet another object is to provide a process for the recovery of anhydrous pyridine bases without requiring the use of extracting solvents. Other objects will become apparent during the subsequent discussion.

According to the present invention, hydrocarbon oil containing organic nitrogen bases is mixed with an aqueous solution of sulfuric acid having a concentration greater than about 50% by weight acid to extract the bases from the oil in the form of nitrogen base sulfates. Pyridine bases are the principal organic nitrogen compounds comprising pyridine and its homologues, including the picolines (monomethyl pyridines), lutidines (dimethyl pyridines), higher polymethyl pyridines, and bicyclic compounds such as quinoline, isoquinoline and their homologues. Other organic nitrogen bases comprise aniline and the toluidines. In the following specification and claims it is to be understood that the term "pyridine" refers to any one of the above organic nitrogen bases singly or to a mixture of bases. Further, it is to be understood that the pyridine concentration in a pyridine-water azeotrope may vary somewhat from a 57% pyridine content by weight depending on the mixture of bases comprising the pyridine.

The resulting pyridine sulfate-acid solution or extract is separated from the oil by decantation and heated, for example, in a simple one-plate still or in a continuous flash unit, to distill off pyridine and water at a composition exceeding the azeotrope and to leave a pyridine sulfate-acid residue. The pyridine-water distillate is fractionated to distill off a pyridine-water azeotrope and to leave an anhydrous pyridine residue as product. The pyridine sulfate-acid residue and the pyridine-water azeotrope are admixed and recycled to the oil-contacting step to recover additional pyridine from the oil. The anhydrous pyridine product may be fractionated to recover individual bases, mixtures of bases within a narrower boiling range or used, as is.

Our invention is based on a totally unexpected discovery relative to the distillation of pyridine from pyridine sulfate-concentrated acid solution. Although it could be predicted that pyridine would be bound more strongly as the acid concentration of the extract is increased, we found that the concentration of pyridine in the distillate or vapor phase increased sharply with increase in the concentration of the sulfuric acid in the still. The expected problems did not materialize. Reference is made to problems which would lead one away from the use of high sulfuric acid concentrations, for example, problems with corrosion, sulfonation of the extracted oil, degradation reactions and the like, usually associated with use of sulfuric acid concentrations up to about 100%.

We found also that the quantity of sulfuric acid used for extracting pyridine from an oil should be controlled to produce an acid extract or pyridine sulfate-acid solution containing pyridine in molar excess to the acid. When the pyridine sulfate-acid solution has a sulfuric acid concentration greater than about 50% by weight acid and a pyridine to acid molar ratio greater than about 1.2 to 1 and preferably at least about 1.6 to 1, the solution may be distilled in a simple one-plate still or in a continuous flash unit, and a composition exceeding the azeotrope is always recovered. Thus the recovered distillate usually contains between 60 and 100 percent pyridine, depending on the acid concentration and may be distilled further to produce anhydrous pyridine as the distillant.

In the single figure of the drawing there are shown in graphic form some Othmer still data for pyridine concentrations in vapor at equilibrium with refluxing sulfuric acid solutions. These curves are shown for pyridine sulfate-acid solutions having ratios of pyridine to acid respectively of 1.2 to 1, 1.6 to 1 and 1.9 to 1. The abscissa and ordinate are Sulfuric Acid Concentration, weight percent and Pyridine In Vapor, weight percent, respectively. A horizontal line intersecting the ordinate at 57% pyridine concentration represents the pyridine-water azeotrope.

It may be seen from the figure that at a given pyridine-acid ratio the distillate exceeds the pyridine-water azeotrop at sulfuric acid concentrations above a certain minimum value. For example, at point A when the pyridine-acid ratio is 1.9 to 1 and at point B when the pyridine-acid ratio is 1.6 to 1, the distillate compositions exceed the pyridine-water azeotrop concentration when the sulfuric acid concentrations exceed about 50% and 64% respectively. It may also be seen that to recover anhydrous pyridine the pyridine-acid ratio should be in excess of about 1.2 to 1 to permit the distillate composition to exceed the pyridine-water azeotrope composition. At the opposite extreme, a pyridine-acid ratio of about 1.9 to 1 is a preferred maximum, although this ratio may approach 2.0 to 1 depending on operating conditions. As the pyridine-acid ratio approaches 2.0 to 1, a concentration somewhat less than 50% by weight acid may be used. To assure at least 1.9 to 1 ratio in the separated solution prior to distillation, the ratio during the oil-extraction step should be about 2.0 to 1, made up by a combination of pyridine in the scrubbing solution and pyridine in the oil. After separation, a small amount of residual pyridine will remain in the oil.

In one manner of practicing our invention, a light oil produced at a typical coke plant may contain between about 0.1 and 0.5 weight percent pyridine. The extraction step in the broadest range would be conducted so that for each 100 parts by weight oil and for each 0.1 weight percent pyridine content the extracting solution would comprise about 1.7 parts pyridine sulfate diluted with sufficient water to provide an aqueous sulfuric acid concentration between about 60 and 100 weight percent. Thus for a commercial operation, 100 parts oil containing about 0.4 percent pyridine would be extracted with an aqueous solution comprising about 6.8 parts pyridine sulfate to produce an aqueous acid extract having an acid concentration of from 60 to 80 weight percent and a pyridine to sulfuric acid mole ratio in the range between about 1.6 to 1 and 2.0 to 1. A temperature between about 20° and 40° C. is preferred for the extraction. Temperatures below about 20° C. may be used, but would ordinarily mean additional expense for refrigeration. Temperatures above about 50° C. should be avoided when using acid concentrations above about 85% to avoid corrosion problems and side reactions.

After separation from the light oil by decantation, the pyridine sulfate-acid solution can be heated to between about 94° and 190° C. in a simple batch still or continuous unit to distill pyridine and water. The vapor is taken overhead and condensed, for example, indirectly by means of a tube-in-shell type heat exchanger. If the rich solution has a pyridine-acid ratio between about 1.9 to 1 and 2.0 to 1, the lean solution or residue from the still will preferably have a pyridine-acid ratio of about 1.6 to 1. If desired, the distillation may be continued until the lean solution has a pyridine-acid ratio approaching 1.2 to 1. The pyridine-water distillate is fractionated, for example, in a multi-tray-distillation column at a temperature between about 94° and 115° C. The overhead product is a pyridine-water azeotrope which is combined with the lean solution or previous still residue and recycled to the pyridine extraction step. The column still residue is anhydrous pyridine.

A complete understanding of the invention may be obtained from the following typical examples of our process.

EXAMPLE 1

4.72 kg. of crude light oil containing 0.4 weight percent pyridine (18.9 g.=0.215 mole) was washed by rapid agitation in an indented flask with 320.2 g. of pyridine sulfate-acid solution comprising 1.785 moles of pyridine and 1.0 mole of sulfuric acid as 60 weight percent acid. This provided a 2 to 1 mole ratio of pyridine to acid in the washer. After 15 minutes of washing and 20 minutes of settling time for phase separation, the acid was decanted from the oil, which now had a pyridine content of 0.19 moles of pyridine and 1.0 mole sulfuric acid. It was fed into a flash still from which at a temperature of about 115° C., 38.6 g. of material was flashed overhead containing 68.5 percent pyridine and 31.5 percent water. This material was fed to a small fractionating column heated to about 115° C. from which was obtained an overhead fraction of pyridine-water azeotrope (28.4 g.) and a bottom fraction of anhydrous pyridine (10.2 g.). The flash still residue comprised the pyridine sulfate-acid residue (291.8 g.) containing 1.6 moles of pyridine and 1.0 mole of sulfuric acid as 65 weight percent acid. For further use, to this residue was added the 28.4 g. of pyridine-water azeotrope to regenerate the extractant, to again comprise 1.785 moles pyridine and 1.0 mole sulfuric acid, as 60 percent acid.

EXAMPLE 2

A second washing test was conducted in a manner similar to that described for Example 1, except that the pyridine sulfate-acid solution contained 1.672 moles of pyridine and 1.0 mole of sulfuric acid as 63 weight percent acid. A 7.2 kg. batch of light oil containing 0.4 weight percent pyridine (28.8 g.=0.328 mole) was washed with 303.0 g. of said solution, providing a 2 to 1 mole ratio of pyridine to acid in the washer. The washed oil contained 0.123 weight percent residual pyridine. The separated acid phase contained 1.9 moles pyridine and 1.0 mole sulfuric acid. It was distilled to yield 31.2 g. of overhead material containing 84.5 weight percent pyridine. This material, when distilled, gave 11.2 g. of pyridine-water azeotrope, and 20 g. of anhydrous pyridine. The pyridine sulfate-acid residue (291.8 g.) contained 1.6 moles pyridine and 1.0 mole sulfuric acid as 65 weight percent acid. To this concentrate was added the pyridine-water azeotrope to regenerate the extracting solution (303 g.) containing 1.672 moles of pyridine and 1.0 mole of sulfuric acid as 63 weight percent acid.

While the above examples illustrate preferred methods of operation, changes therein may be made without departing from the spirit of the invention. It will be apparent that, for commercial operation of our process, the hereinabove described equipment may be of any design known to effect the desired results. While a coke-oven light oil is one source of pyridine, other coke plant streams or gases containing even higher pyridine concentrations may be extracted. Our process may be used to extract pyridine from petroleum fractions and other production or waste streams.

Although we have disclosed herein the practice of our invention, we intend to cover as well any changes or modifications therein which may be made without departing from the spirit and scope of the invention.

We claim:

1. A process of recovering pyridine from hydrocarbon oil containing it consisting essentially of contacting said oil with an aqueous solution of sulfuric acid having a concentration greater than about 50% by weight acid to convert the pyridine to pyridine sulfate, separating the resulting pyridine sulfate-acid solution from the oil, heating said separated solution to distill off pyridine and water and to leave a pyridine sulfate-acid residue and fractionating said resulting pyridine and water to distill off a pyridine-water azeotrope and to leave an anhydrous pyridine residue.

2. A process as defined in claim 1 characterized by admixing said pyridine sulfate-acid residue and said pyridine-water azeotrope and circulating the resulting solution into said oil-contacting step to recover additional pyridine.

3. A process as defined in claim 1 characterized by said aqueous solution of sulfuric acid being present in sufficient volume to establish in the contacting means a ratio of about 2 moles pyridine to a mole of acid.

4. A process as defined as defined in claim 1 characterized by said separated solution consisting essentially of in excess of 1.2 moles pyridine to each mole of sulfuric acid.

5. A process as defined in claim 1 characterized by said separated solution consisting essentially of at least about 1.6 moles pyridine to each mole of sulfuric acid.

6. A process of recovering pyridine from hydrocarbon oil containing it consisting essentially of contacting said oil with pyridine sulfate-acid solution containing about 1.6 moles pyridine and 1.0 mole sulfuric acid as about 63% by weight acid, said solution being present in sufficient volume to establish in the contacting means a ratio of about 2 moles pyridine to a mole of acid, separating pyridine-enriched, pyridine sulfate-acid solution from the oil, heating said separated solution to distill off pyridine and water and to leave a pyridine sulfate-acid residue, fractionating said resulting pyridine and water to distill off a pyridine-water azeotrope and to leave an anhydrous pyridine residue, admixing said pyridine sulfate-acid residue and said pyridine-water azeotrope and circulating the resulting solution containing about 1.6 moles pyridine and 1.0 mole sulfuric acid, as about 63% by weight acid into said oil-contacting step to recover additional pyridine.

References Cited

UNITED STATES PATENTS 2,410,906 11/1946 Stewart _____ 260—290
2,997,477 8/1961 Eisenlohr et al. _____ 260—290

OTHER REFERENCES

Lowry, H.H., Chemistry of Coal Utilization (Wiley & Sons, Inc., New York, 1945), pp. 1016 and 1131.

HENRY R. JILES, *Primary Examiner.*

C. M. SHURKO, *Assistant Examiner.*

U.S. Cl. X..R.

260—283, 582; 203—35, 83